(12) United States Patent
Kawai

(10) Patent No.: US 12,418,250 B2
(45) Date of Patent: Sep. 16, 2025

(54) ELECTRONIC CIRCUITRY, POWER CONVERSION DEVICE, AND METHOD

(71) Applicant: KABUSHIKI KAISHA TOSHIBA, Tokyo (JP)

(72) Inventor: Shusuke Kawai, Yokohama Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 175 days.

(21) Appl. No.: 18/185,304

(22) Filed: Mar. 16, 2023

(65) Prior Publication Data
US 2024/0079970 A1 Mar. 7, 2024

(30) Foreign Application Priority Data

Sep. 7, 2022 (JP) .................. 2022-142445

(51) Int. Cl.
 *H02M 7/00* (2006.01)
 *H02M 1/00* (2006.01)
 *H02M 1/088* (2006.01)
 *H02M 7/539* (2006.01)

(52) U.S. Cl.
 CPC ......... *H02M 7/539* (2013.01); *H02M 1/0009* (2021.05); *H02M 1/0025* (2021.05); *H02M 1/0067* (2021.05); *H02M 1/088* (2013.01)

(58) Field of Classification Search
 CPC .. H02M 7/539; H02M 1/0009; H02M 1/0025; H02M 1/0067
 See application file for complete search history.

(56) References Cited

U.S. PATENT DOCUMENTS

| | | | |
|---|---|---|---|
| 10,333,509 B2 | 6/2019 | Kaeriyama | |
| 10,554,202 B2 | 2/2020 | Nomura | |
| 11,894,837 B2 | 2/2024 | Matsubara | |
| 2003/0048086 A1* | 3/2003 | Takahashi | H02M 7/53803 |
| | | | 318/430 |

(Continued)

FOREIGN PATENT DOCUMENTS

| | | |
|---|---|---|
| JP | 2008-78816 A | 4/2008 |
| JP | 2011-172446 A | 9/2011 |

(Continued)

OTHER PUBLICATIONS

Yang Wen et al., "Active Gate Driver for Improving Current Sharing Performance of Paralleled High-Power SiC MOSFET Modules", IEEE Trans. on Power Elecs., vol. 36, No. 2, pp. 1491-1505 (2021).

(Continued)

*Primary Examiner* — Adolf D Berhane
*Assistant Examiner* — Afework S Demisse
(74) *Attorney, Agent, or Firm* — Finnegan, Henderson, Farabow, Garrett & Dunner, LLP

(57) ABSTRACT

In one embodiment, electronic circuitry includes a processing circuit. The processing circuit generates waveform data of a drive current to be supplied to the switching element, provides the waveform data to a drive circuit of the switching element, and at turn-on of the switching element, corrects the waveform data based on a load current flowing through a load connected to the switching element and a surge current of the switching element.

14 Claims, 12 Drawing Sheets

(56) References Cited

U.S. PATENT DOCUMENTS

2018/0269869 A1    9/2018   Mukhopadhyay et al.
2022/0045641 A1*   2/2022   Hattori ................ H02M 1/0009

FOREIGN PATENT DOCUMENTS

| JP | 2017-229151 A | 12/2017 |
|---|---|---|
| JP | 2018-38174 A | 3/2018 |
| JP | 6355775 B2 | 7/2018 |
| JP | 2021-191088 A | 12/2021 |

OTHER PUBLICATIONS

Japan Patent Office, Office Action in JP Patent App. No. 2022-142445 (Apr. 25, 2025).

* cited by examiner

US 12,418,250 B2

ELECTRONIC CIRCUITRY, POWER CONVERSION DEVICE, AND METHOD

REFERENCE TO RELATED APPLICATIONS

This application is based upon and claims the benefit of priority from the prior Japanese Patent Application No. 2022-142445, filed on Sep. 7, 2022, the entire contents of which are incorporated herein by reference.

FIELD

The present embodiment relates to electronic circuitry, a power conversion device, and a method.

BACKGROUND ART

In the field of power electronics, semiconductor switching elements such as MOSFETs (metal oxide semiconductor field effect transistors) or IGBTs (insulated gate bipolar transistors) are used. In a circuit including these switching elements, power loss can be reduced by increasing the speed of switching operations of the elements. However, when the speed of switching operations of the elements is excessively increased, ringing occurs in current flowing at turn-on or at turn-off of the elements. Such current ringing causes noise to occur. In other words, reduction of power loss and suppression of noise have a trade-off relationship.

As a method for optimizing the above-described trade-off, active gate control technology has been studied. In the active gate control technology, waveforms of drive signals at turn-on and at turn-off of switching elements are experimentally or theoretically determined in advance so as to achieve both reduction of power loss and suppression of noise, and these waveform data are stored in a storage circuit. Drive circuits of the switching elements generate drive signals in accordance with waveform data provided from the storage circuit, and drive the switching elements by the drive signals.

The present embodiment has an object to provide electronic circuitry that generates waveform data of a drive current such that reduction of power loss and suppression of noise at turn-on of a switching element are both achieved.

In order to achieve the above-described object, an electronic circuitry according to the present embodiment comprises a processing circuit configured to: generate waveform data of a drive current to be supplied to a switching element, provide the waveform data to a drive circuit of the switching element, and at turn-on of the switching element, correct the waveform data based on a load current flowing through a load connected to the switching element and a surge current of the switching element.

In addition, a power conversion device according to the present embodiment comprises a power conversion circuit including two switching elements that constitute an arm pair, and two drive circuits configured to supply a drive current to the two switch elements respectively, and a processing circuit configured to: generate waveform data of the drive current, provide the waveform data to the drive circuits, and at turn-on of the switching elements, correct the waveform data based on a load current flowing through a load connected to the switching elements and a surge current of the switching elements.

In addition, a method according to the present embodiment comprising: generating waveform data of a drive current to be supplied to a switching element, providing the waveform data to a drive circuit of the switching element, and at turn-on of the switching element, correcting the waveform data based on a load current flowing through a load connected to the switching element and a surge current of the switching element.

DETAILED DESCRIPTION

Figure 1:
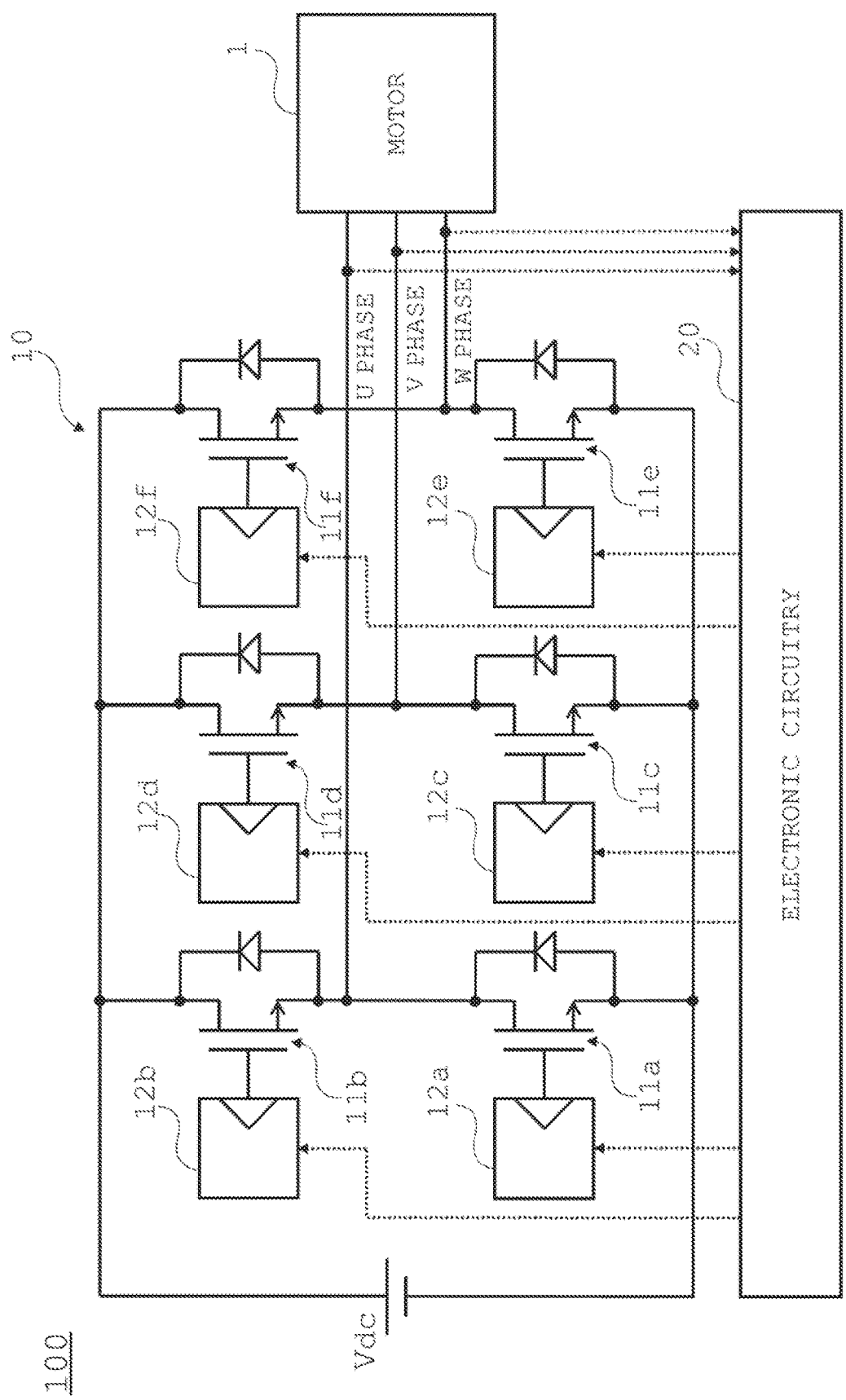
FIG. 1 illustrates a configuration of a motor control system according to Embodiment 1.

Hereinafter, an embodiment will be described with reference to the drawings. The same or corresponding elements in the drawings are denoted by the same reference, and detailed description will be omitted as appropriate.

Embodiment 1

FIG. 1 illustrates a configuration of a motor control system 100 according to Embodiment 1. The motor control system 100 comprises a three-phase AC motor 1 as a load, a DC power supply Vdc, switching elements 11a to 11f constituting a three-phase inverter circuit 10, and drive circuits 12a to 12f which drive the switching elements 11a to 11f respectively.

The switching elements 11a and 11b are N-channel MOSFETs. The switching elements 11a and 11b constitute a U-phase arm pair of the inverter circuit 10. The drive circuit 12a controls a gate current (drive current) of the switching element 11a to control switching operation, i.e., turn-on and turn-off of the switching element 11a. The drive circuit 12b controls a gate current of the switching element 11b to control switching operation of the switching element 11b.

Similarly, the switching elements 11c and 11d are N-channel MOSFETs. The switching elements 11c and 11d constitute a V-phase arm pair of the inverter circuit 10. The drive circuit 12c controls a gate current of the switching element 11c to control switching operation of the switching element 11c. The drive circuit 12d controls a gate current of the switching element 11d to control switching operation of the switching element 11d.

Similarly, the switching elements 11e and 11f are N-channel MOSFETs. The switching elements 11e and 11f constitute a W-phase arm pair of the inverter circuit 10. The drive circuit 12e controls a gate current of the switching element 11e to control switching operation of the switching element 11e. The drive circuit 12f controls a gate current of the switching element 11f to control switching operation of the switching element 11f.

The motor control system 100 also comprises electronic circuitry 20. electronic circuitry 20 determines and stores waveform data of the gate currents of the switching elements 11a to 11f prior to running of the motor control system 100. Electronic circuitry 20 provides waveform data of the gate currents to the drive circuits 12a to 12f for the switching elements 11a to 11f based on U-phase, V-phase, and W-phase currents of the motor 1 when the motor control system 100 is running.

In particular, electronic circuitry 20 provides waveform data of the gate currents to the drive circuits 12a and 12b based on the U-phase current of the motor 1. The drive circuit 12a generates a gate current in accordance with the waveform data provided from electronic circuitry 20, and supplies the gate current to the switching element 11a. The drive circuit 12b generates a gate current in accordance with the waveform data provided from electronic circuitry 20, and supplies the gate current to the switching element 11b.

Similarly, electronic circuitry 20 provides waveform data of the gate currents to the drive circuits 12c and 12d based on the V-phase current of the motor 1. The drive circuit 12c generates a gate current in accordance with the waveform data provided from electronic circuitry 20, and supplies the gate current to the switching element 11c. The drive circuit 12d generates a gate current in accordance with the waveform data provided from electronic circuitry 20, and supplies the gate current to the switching element 11d.

Similarly, electronic circuitry 20 provides waveform data of the gate currents to the drive circuits 12e and 12f based on the W-phase current of the motor 1. The drive circuit 12e generates a gate current in accordance with the waveform data provided from electronic circuitry 20, and supplies the gate current to the switching element 11e. The drive circuit 12f generates a gate current in accordance with the waveform data provided from electronic circuitry 20, and supplies the gate current to the switching element 11f.

Herein, an operation at turn-on of the switching elements 11a to 11f in FIG. 1 will be described. The following description focuses on the switching element 11a, and an operation when the switching element 11a is turned on will be described. However, the following description also similarly holds for the other switching elements 11b to 11f.

Figure 2:
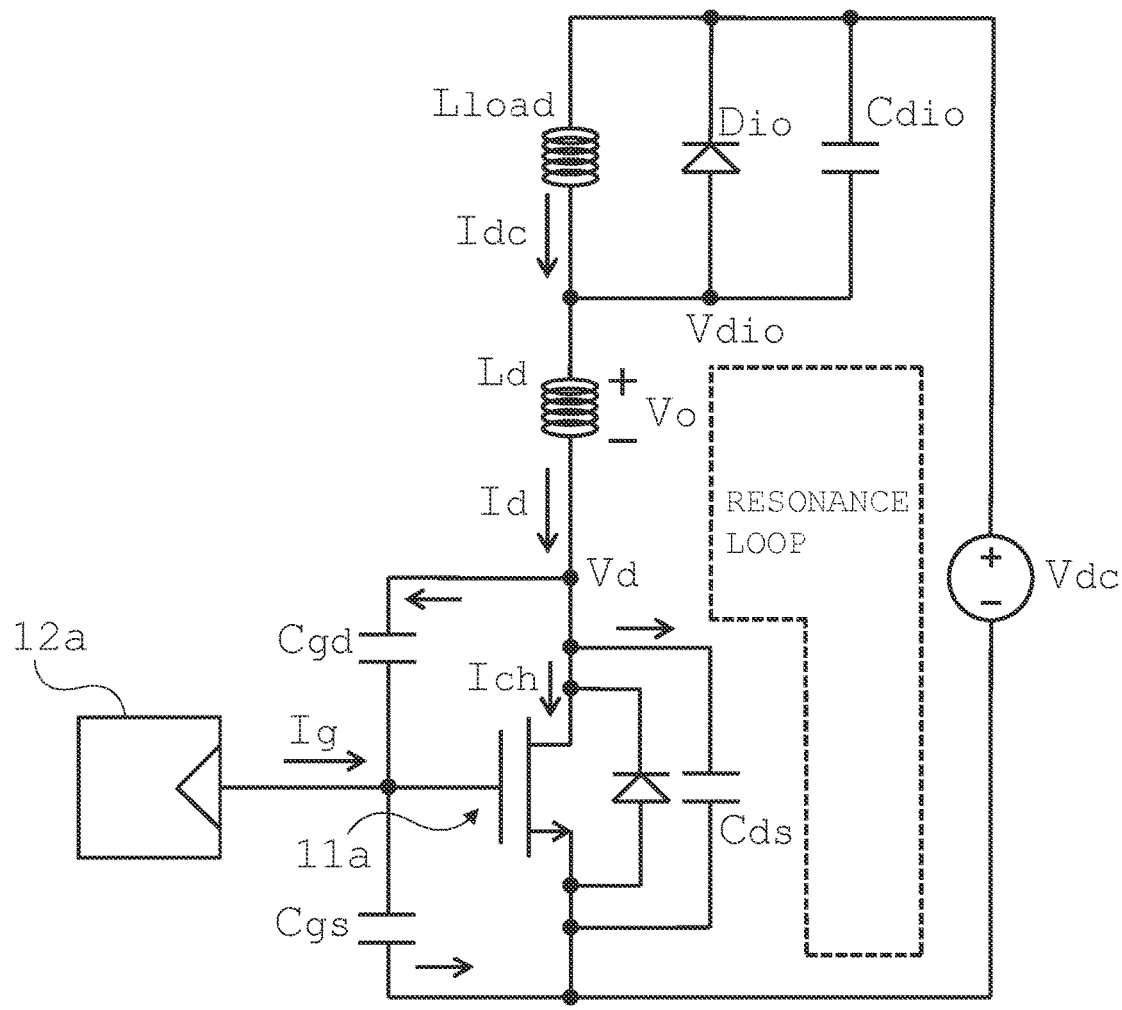
FIG. 2 is an equivalent circuit at turn-on of a switching element.

FIG. 2 is an equivalent circuit at turn-on of the switching element 11a in FIG. 1. When the switching element 11a is turned on, the switching element 11b that constitutes the U-phase arm pair together with the switching element 11a is OFF. In FIG. 2, the switching element 11b in OFF is represented by a diode Dio and a parasitic capacitor Cdio.

An inductor Lload represents inductance of the motor 1 which is a load. An inductor Ld represents parasitic inductance of a wiring between the drain terminals of the switching elements 11a and 11b.

The switching element 11a has a gate-source parasitic capacitor Cgs, a gate-drain parasitic capacitor Cgd and a drain-source parasitic capacitor Cds. The drive circuit 12a supplies a gate current Ig to the gate terminal of the switching element 11a.

Figure 3:
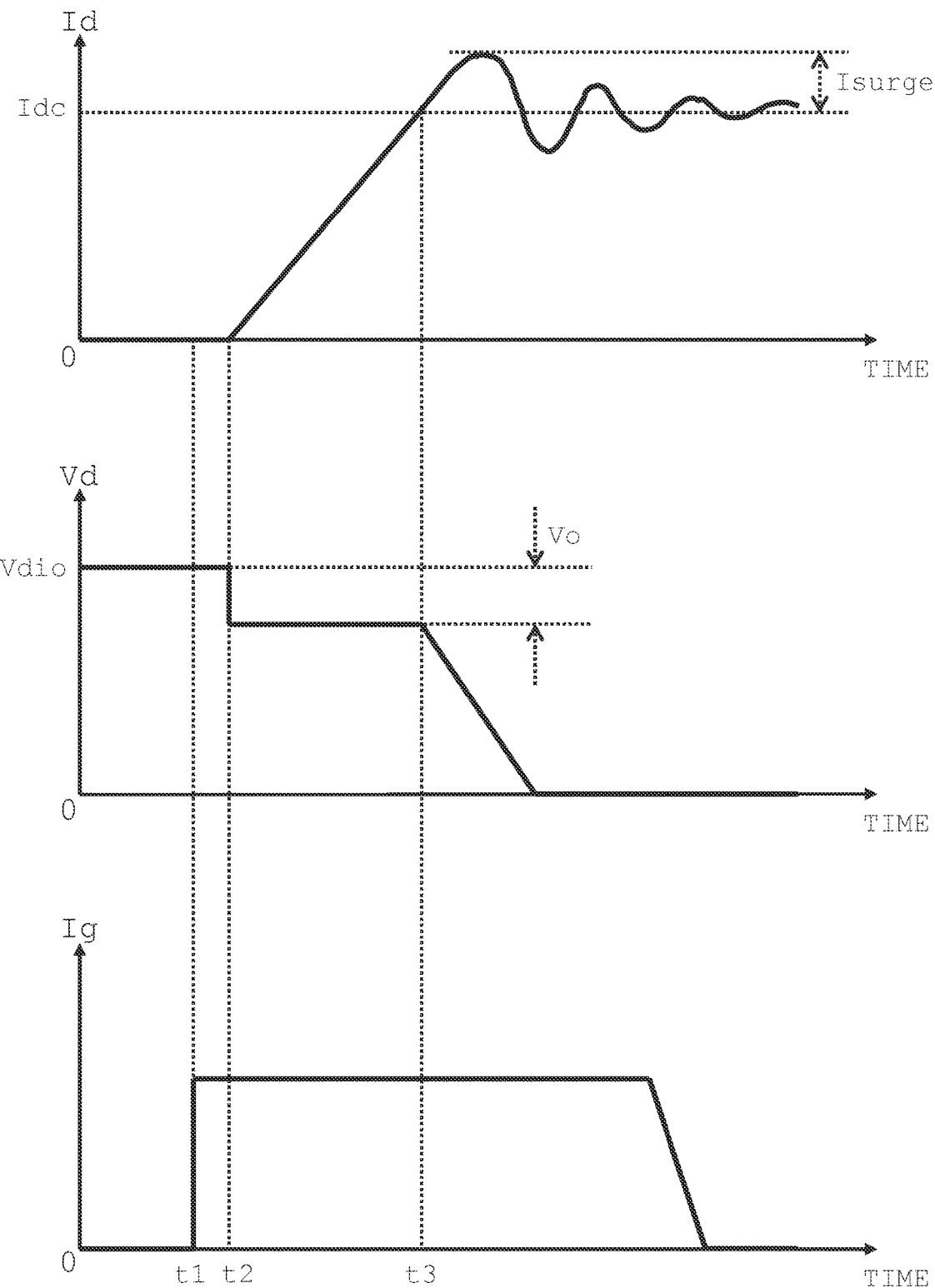
FIG. 3 is a timing chart describing an operation at turn-on of a switching element.

FIG. 3 is a timing chart describing an operation at turn-on of the switching element 11a. In an initial state on the left end of FIG. 3, the gate current Ig supplied from the drive circuit 12a is 0, and the gate voltage of the switching element 11a is also 0. Consequently, the switching element 11a is OFF, the drain current Id is 0, and the drain voltage Vd is equal to an anode-side voltage Vdio of the diode Dio.

At time t1, the drive circuit 12a increases the gate current Ig stepwise. This causes charging of the gate-source parasitic capacitor Cgs of the switching element 11a to be started, and the gate voltage of the switching element 11a rises.

At time t2, when the gate voltage of the switching element 11a exceeds a threshold voltage, a channel is formed and the drain current Id starts flowing. The drain current Id increases along with the rise in gate voltage. In FIG. 3, the increase of the drain current Id is approximated by a linear function.

At this time, the diode Dio is ON, and the anode-side voltage Vdio of the diode Dio does not change and is constant. On the other hand, the flow of the drain current Id produces a voltage Vo across both terminals of the inductor Ld, and the drain voltage Vd decreases.

At time t3, when the drain current Id becomes equal to a stationary component of current flowing through the inductor Lload, i.e., the load current Idc, the diode Dio is turned off, and the anode-side voltage Vdio of the diode Dio decreases. At this time, a resonance loop as shown in FIG. 2 is formed, and ringing of the drain current Id occurs. A peak value of an amplitude of ringing of the drain current Id, i.e., the magnitude of the surge current Isurge, is proportionate to the terminal-to-terminal voltage Vo of the inductor Ld at the start time of resonance.

As described earlier, Embodiment 1 intends to achieve both reduction of power loss and suppression of noise at turn-on of the switch element 11a.

First, from the point of view of reduction of power loss, it is desirable that the gate current Ig be larger. When the gate current Ig is large, the gate voltage rapidly rises, and the inclination of the drain current Id increases. As a result, the time period until turn-on has completed is shortened, and power loss is reduced.

On the other hand, from the point of view of suppression of noise, it is desirable that the gate current Ig be smaller. As described earlier, the peak value of the amplitude of ringing of the drain current Id responsible for noise, i.e., the magnitude of the surge current Isurge, is proportionate to the terminal-to-terminal voltage Vo of the inductor Ld at the start time of resonance. Thus, the surge current Isurge responsible for noise can be decreased by decreasing the terminal-to-terminal voltage Vo of the inductor Ld at the start time of resonance.

In order to decrease the terminal-to-terminal voltage Vo of the inductor Ld at the start time of resonance, it is desirable that the gate current Ig be smaller. When the gate current Ig is small, the inclination of the drain current Id decreases, and the rate of change of current flowing through the inductor Ld is reduced. Thus, the terminal-to-terminal voltage Vo of the inductor Ld at the start time of resonance decreases. Consequently, it is desirable that the gate current Ig be smaller from the point of view of suppression of noise.

Figure 4:
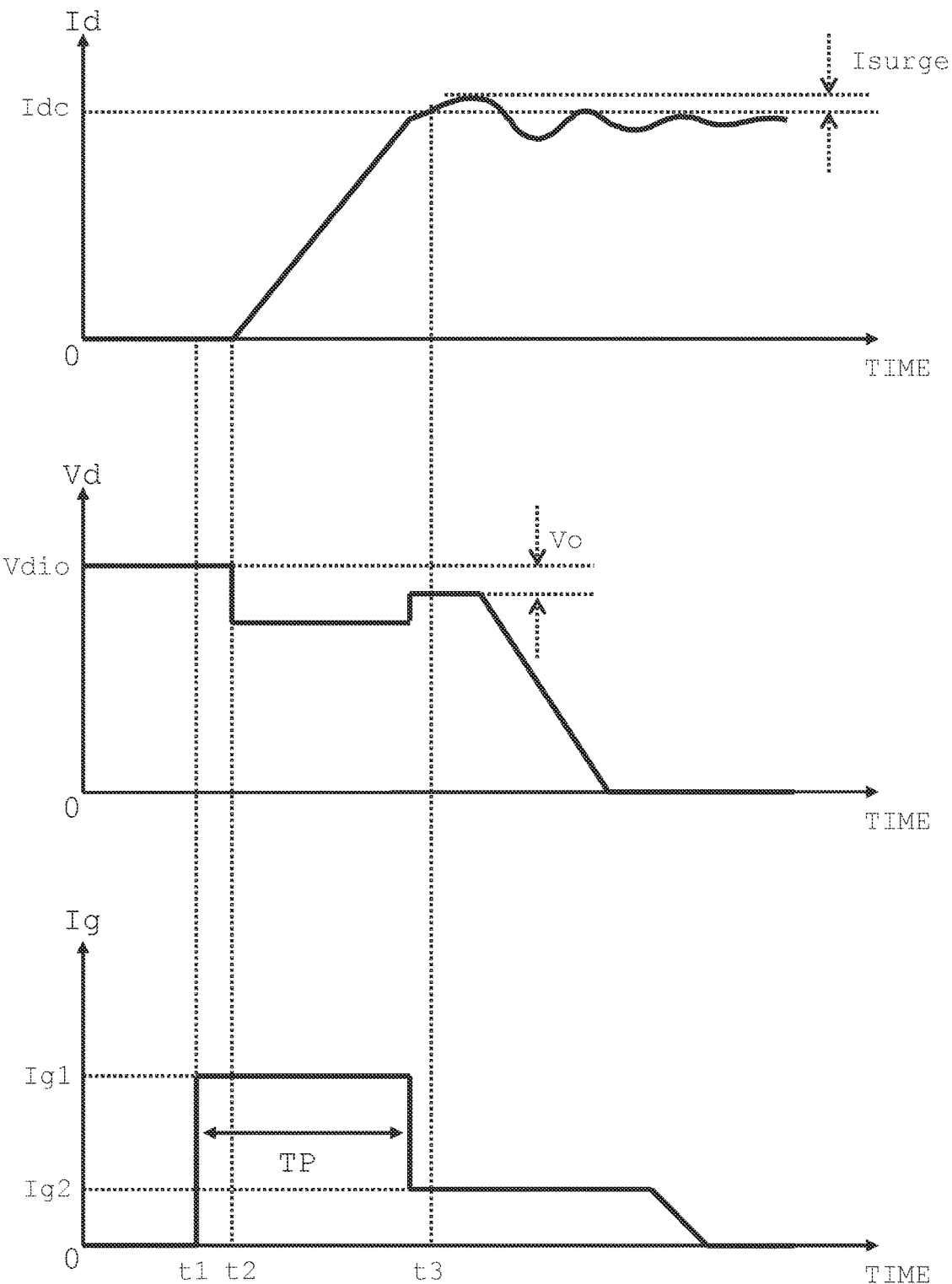
FIG. 4 is a timing chart describing a preferable operation at turn-on of a switching element.

From the above-described consideration, in order to achieve both reduction of power loss and suppression of noise in the switching element 11a, it is preferable that a large gate current (a first current value Ig1) be supplied in a period TP from the start time of supply of the gate current Ig until immediately before time t3 at which the resonance loop is formed, and a small gate current (a second current value Ig2) be supplied in a subsequent period, as shown in FIG. 4.

By supplying a large gate current until immediately before the resonance loop is formed, the time period until turn-on has completed is shortened, and power loss is reduced. In addition, by supplying a small gate current from immediately before the resonance loop is formed, the terminal-to-terminal voltage Vo of the inductor Ld at the start time of resonance decreases, and the peak value of ringing of the drain current Id responsible for noise, i.e., the surge current Isurge, decreases.

Figure 5:
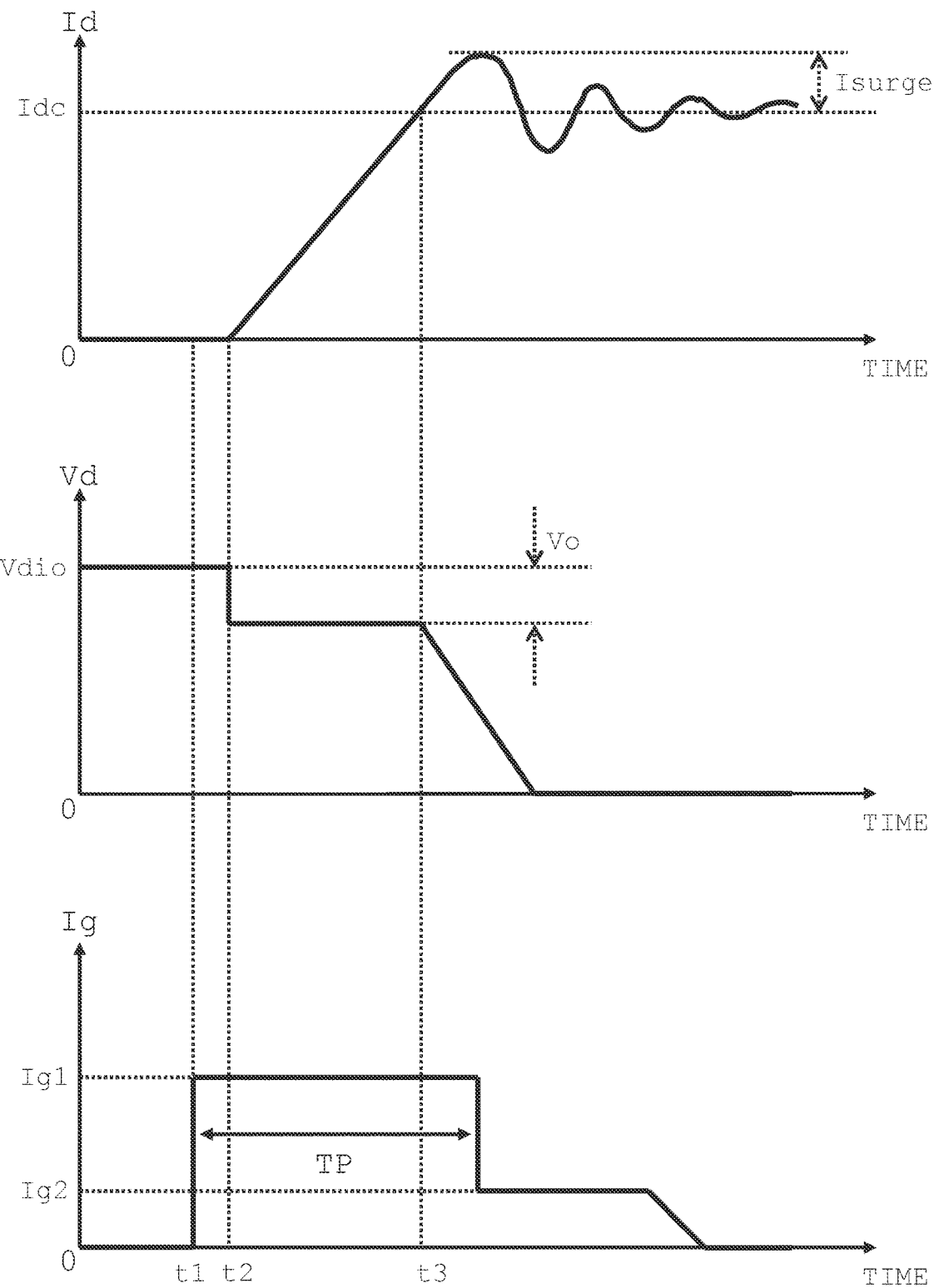
FIG. 5 is a timing chart describing an unpreferable operation at turn-on of a switching element.

Note that as shown in FIG. 5, if the period TP being excessively long makes the time at which the gate current Ig is reduced later than time t3 at which the resonance loop is formed, ringing of the drain current Id responsible for noise is not suppressed because the terminal-to-terminal voltage Vo at the start time of resonance of the inductor Ld is large although power loss is reduced.

Figure 6:
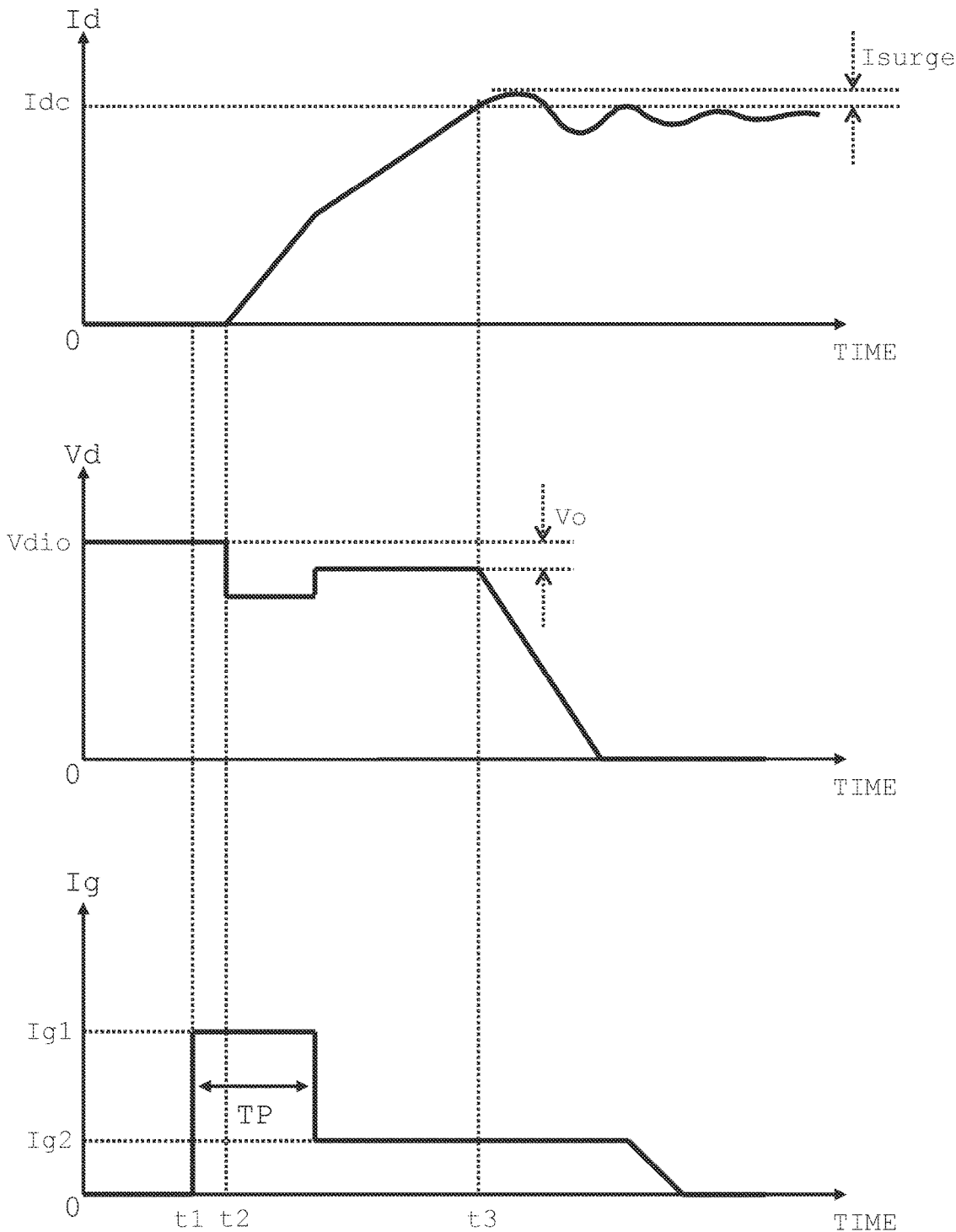
FIG. 6 is a timing chart describing an unpreferable operation at turn-on of a switching element.

As shown in FIG. 6, if the period TP being excessively short makes the time at which the gate current Ig is reduced excessively earlier than time t3 at which the resonance loop is formed, the effect of reducing power loss is low although ringing of the drain current Id responsible for noise is suppressed.

Consequently, it is most preferable that the length of the period TP, i.e., the time at which the gate current Ig is reduced, is immediately before time t3 at which the resonance loop is formed, as shown in FIG. 4 described earlier.

Herein, as described earlier, time t3 at which the resonance loop is formed is the time at which the drain current Id and the load current Idc flowing through the motor 1 become equal, and the diode Dio is turned on. In other words, time t3 at which the resonance loop is formed changes in accordance with the value of the load current Idc flowing through the motor 1. Considering this fact, in Embodiment 1, the length of the period TP of the first current value Ig1 in the gate current Ig is changed in accordance with the value of the load current Idc.

Figure 7:
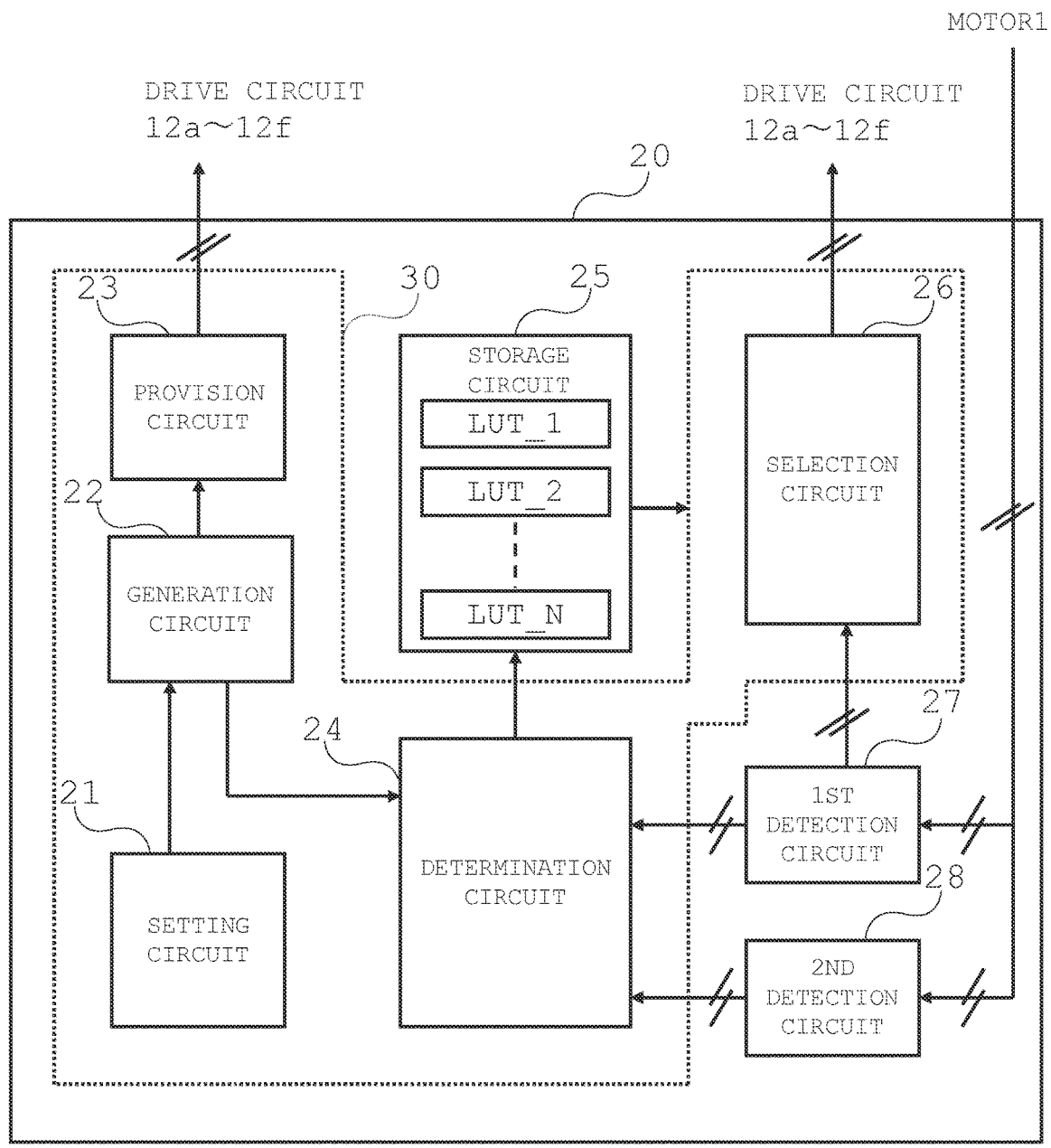
FIG. 7 illustrates an inner configuration of electronic circuitry.

FIG. 7 illustrates an inner configuration of electronic circuitry 20 in FIG. 1. Electronic circuitry 20 comprises a setting circuit 21, a generation circuit 22, a provision circuit 23, a determination circuit 24, a storage circuit 25 and a selection circuit 26. Electronic circuitry 20 also comprises a first detection circuit 27 that detects the load current Idc which is a stationary component of current flowing through the motor 1 and a second detection circuit 28 that detects the surge current Isurge which is the peak value of the amplitude of ringing of the drain current Id.

At least one of the setting circuit 21, the generation circuit 22, the provision circuit 23, the determination circuit 24 and the selection circuit 26 may be included in a processing circuit 30. The processing circuit 30 is implemented by at least one processor. The processor includes a control circuit and an arithmetic circuit, for example, and is implemented by a circuit that performs analog signal processing, a circuit that performs digital signal processing, or the like. The processor may be a CPU (central processing unit), a DSP (digital signal processor), a general purpose processor, a microprocessor, ASIC, FPGA, a semiconductor chip, a discrete part, and a combination thereof.

The setting circuit 21 sets values of N reference currents I1 to IN to be used as references when generating and selecting waveform data of the gate current Ig of the switching elements 11a to 11f, where I1> . . . >IN>0.

The generation circuit 22 generates waveform data of the gate current Ig supplied from the drive circuits 12a to 12f to the switching elements 11a to 11f when turning on the switching elements 11a to 11f prior to running of the motor control system 100. Alternatively, the generation circuit 22 corrects the waveform data based on the load current Idc flowing through the motor 1 and the surge current Isurge of the switching elements 11a to 11f.

The provision circuit 23 provides the waveform data generated or corrected by the generation circuit 22 to the drive circuits 12a to 12f of the switching elements 11a to 11f prior to running of the motor control system 100, and drives the switching elements 11a to 11f with the gate current Ig in accordance with the waveform data.

The determination circuit 24 determines waveform data in accordance with the load current Idc flowing through the motor 1 and the surge current Isurge of the switching elements 11a to 11f when turning on the switching elements 11a to 11f prior to running of the motor control system 100. The determination circuit 24 determines N waveform data in which the lengths of the period TP of the first current value Ig1 are different from each other, in accordance with the value of the load current Idc.

The storage circuit 25 includes N look-up tables (LUT_1 to LUT_N). LUT_1 to LUT_N store the N waveform data determined by the determination circuit 24.

The selection circuit 26 selects one of the N waveform data stored in LUT_1 to LUT_N of the storage circuit 25 based on the load current Idc of the motor 1 detected by the first detection circuit 27 when turning on the switching elements 11a to 11f at running of the motor control system 100, and provides the selected waveform data to the drive circuits 12a to 12f of the switching elements 11a to 11f.

In particular, when turning on the switching element 11a or 11b that constitutes the U-phase arm pair, the selection circuit 26 selects one of the N waveform data stored in LUT_1 to LUT_N of the storage circuit 25 based on the load current Idc in U-phase detected by the first detection circuit 27.

Similarly, when turning on the switching element 11c or 11d that constitutes the V-phase arm pair, the selection circuit 26 selects one of the N waveform data stored in LUT_1 to LUT_N of the storage circuit 25 based on the load current Idc in V-phase detected by the first detection circuit 27.

Similarly, when turning on the switching element 11e or 11f that constitutes the W-phase arm pair, the selection circuit 26 selects one of the N waveform data stored in LUT_1 to LUT_N of the storage circuit 25 based on the load current Idc in W-phase detected by the first detection circuit 27.

Figure 8:
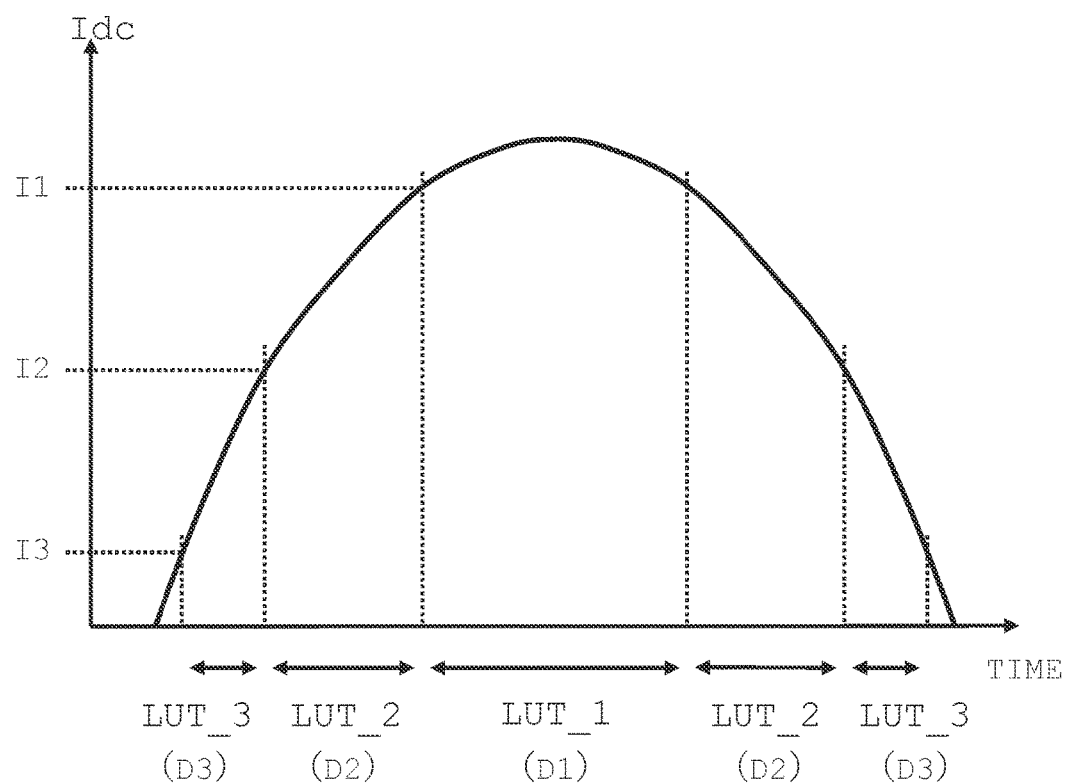
FIG. 8 shows an example for selecting waveform data by a selection circuit.

FIG. 8 shows an example for selecting waveform data by the selection circuit 26, where N=3. Waveform data D1 to D3, in which the lengths of the period TP are different from each other, are stored in LUT_1 to LUT_3. In addition, the three reference currents I1 to I3 to be used as references when selecting waveform data are defined, where I1>I2>I3>0.

When the load current Idc is more than or equal to the reference current I1, i.e., dc>=I1, the waveform data D1 stored in LUT_1 is selected.

When the load current Idc is smaller than the reference current I1 and more than or equal to the reference current I2, i.e., I2<=Idc<I1, the waveform data D2 stored in LUT_2 is selected.

When the load current Idc is smaller than the reference current I2 and more than or equal to the reference current I3, i.e., I3<=Idc<I2, the waveform data D3 stored in LUT_3 is selected.

Figure 9:
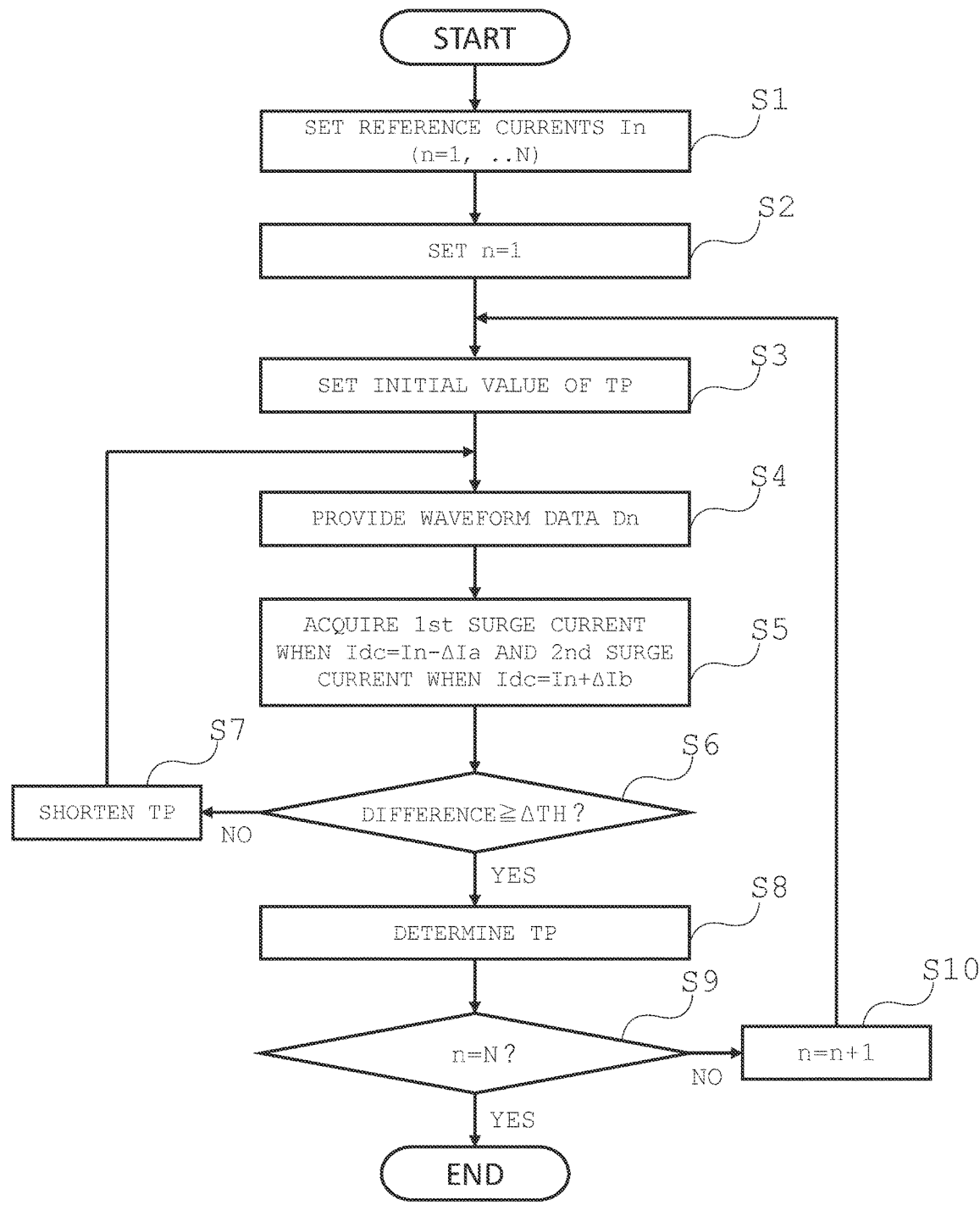
FIG. 9 is a flow chart describing an operation of determining waveform data performed by electronic circuitry.

Next, a detailed operation when electronic circuitry 20 according to Embodiment 1 determines waveform data of the gate current Ig of the switching elements 11a to 11f will be described. FIG. 9 is a flow chart describing an operation when electronic circuitry 20 determines waveform data of the gate current Ig. In addition, the following description will be given focusing on the switching element 11*a*. However, the following description also similarly holds for the other switching elements 11*b* to 11*f*.

In Step S1, the setting circuit 21 sets the values of the reference currents In (n=1 to N) to be used as references when generating waveform data of the gate current Ig. In the case N=3, for example, the setting circuit 21 sets the values of I1, I2 and I3, where I1>I2>I3>0. In Step S2, the setting circuit 21 sets the value of an index n at 1.

In Step S3, the generation circuit 22 sets an initial value of the length of period TP in accordance with the value of the index n, and generates (temporary) waveform data Dn. In the case n=1, for example, the initial value of the length of the period TP in the waveform data D1 is set at the maximum value allowed in terms of specifications of the switching element 11*a*. In the case n>1, the initial value of the length of the period TP in the waveform data Dn is set at the length of the period TP in the waveform data Dn−1 determined in Step S8 which will be described later.

In Step S4, the provision circuit 23 provides the waveform data Dn generated in Step S3 described above or the waveform data Dn corrected in Step S7 which will be described later to the drive circuit 12*a*. In the case n=1, for example, the waveform data D1 is provided to the drive circuit 12*a*. The drive circuit 12*a* generates the gate current Ig in accordance with the provided waveform data Dn, and supplies the gate current Ig to the switching element 11*a*. This causes turn-on of the switching element 11*a* to be started, and the load current Idc of the motor 1 detected by the first detection circuit 27 increases.

In Step S5, the determination circuit 24 acquires, from the second detection circuit 28, a first surge current value when the load current Idc=the reference current In −ΔIa and a second surge current value when the load current Idc=the reference current In+ΔIb. Where ΔIa and ΔIb are predetermined first small value and second small value.

In the case n=1, for example, the first surge current value when the load current Idc=the reference current I1−ΔIa and the second surge current value when the load current Idc=the reference current I1+ΔIb are acquired. Note that the first small value ΔIa and the second small value ΔIb may have any magnitudes. For example, they are set to about 1 to 10% of a difference between the reference current In and the reference current In+1.

In Step S6, the determination circuit 24 determines whether the difference between the first surge current value and the second surge current value is more than or equal to a predetermined value ΔTH. If the difference between the first surge current value and the second surge current value is less than the predetermined value ΔTH (Step S6=NO), the process proceeds to Step S7. On the other hand, if the difference between the first surge current value and the second surge current value is more than or equal to the predetermined value ΔTH (Step S6=YES), the process proceeds to Step S8.

In Step S7, the generation circuit 22 corrects the waveform data Dn provided in Step S4 to the waveform data Dn in which the length of the period TP is shortened by a predetermined amount. In the case n=1, for example, the waveform data D1 is corrected to the waveform data D1 in which the length of the period TP is shortened by the predetermined amount. Thereafter, the process returns to Step S4 described above.

In Step S8, the determination circuit 24 acquires the present value of the period TP from the generation circuit 22, and determines the length of the period TP in the waveform data Dn to be the acquired value. The determination circuit 24 causes the waveform data Dn having the determined period TP to be stored in a corresponding one of the look-up tables. In the case n=1, for example, the waveform data D1 having the determined period TP is stored in LUT_1.

In Step S9, the setting circuit 21 determines whether the index n=N. In case n<N, i.e., storing process of the N waveform data into the look-up tables has not been completed (Step S9=NO), the setting circuit 21 adds 1 to the value of the index n (Step S10), the process returns to Step S3. On the other hand, in the case n=N, i.e., storing process of the N waveform data into the look-up tables has been completed (Step S9=YES), the process ends.

Figure 10:
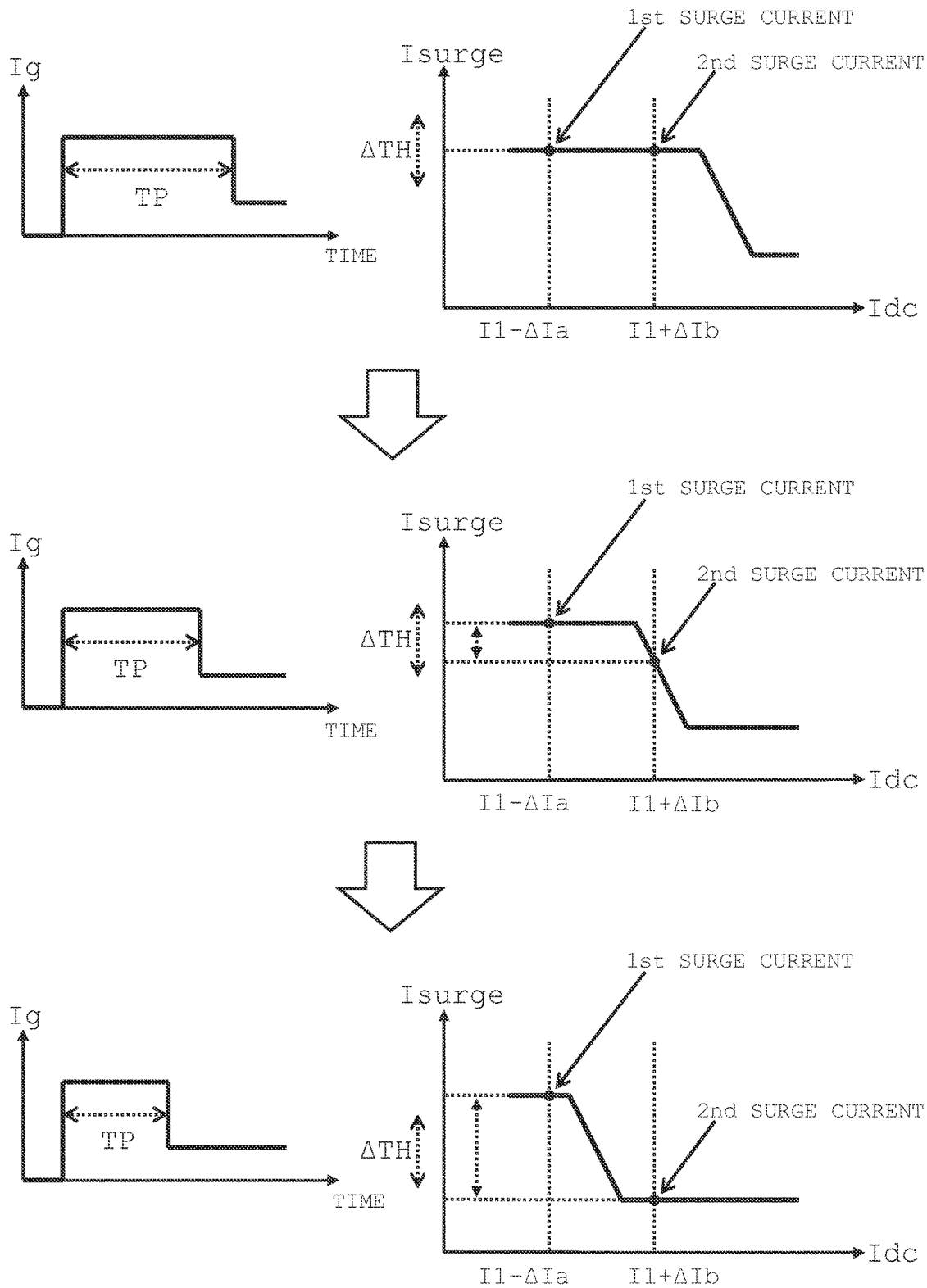
FIG. 10 shows a way until waveform data is determined.

FIG. 10 shows a way until the length of the period TP in the waveform data D1 is shortened stepwise by the predetermined amount and determined. At the top of FIG. 10, the first surge current value and the second surge current value are equal, both of which is a large value, and the difference between the first surge current value and the second surge current value is less than the predetermined value ΔTH (Step S6=NO in FIG. 9). This means that the period TP being excessively long makes the time at which the gate current Ig is reduced later than the time at which the resonance loop is formed. In this case, ringing of the drain current Id responsible for noise is not suppressed although power loss is reduced. Consequently, the generation circuit 22 shortens the length of the period TP in the waveform data D1 by the predetermined amount (Step S7 in FIG. 9).

At the middle of FIG. 10, the first surge current value and the second surge current value are slightly different but are both large values, and the difference between the first surge current value and the second surge current value is less than the predetermined value ΔTH (Step S6=NO in FIG. 9). This means that the period TP being still excessively long makes the time at which the gate current Ig is reduced later than the time at which the resonance loop is formed. In this case, ringing of the drain current Id responsible for noise is not sufficiently suppressed although power loss is reduced. Consequently, the generation circuit 22 further shortens the length of the period TP in the waveform data D1 by the predetermined amount (Step S7 in FIG. 9).

At the bottom of FIG. 10, the first surge current value and the second surge current value are greatly different, and the difference between the first surge current value and the second surge current value is more than or equal to the predetermined value ΔTH (Step S6=YES in FIG. 9). In other words, the surge current value abruptly changes in the vicinity of the load current Idc=the reference current I1. This means that the time at which the gate current Ig is reduced and the time at which the resonance loop is formed are substantially equal. In this case, power loss is reduced, and ringing of the drain current Id responsible for noise is also sufficiently suppressed. In other words, reduction of power loss and suppression of noise are both achieved. Consequently, the determination circuit 24 determines the length of the period TP in the waveform data D at the present value (Step S8 in FIG. 7).

Figure 11:
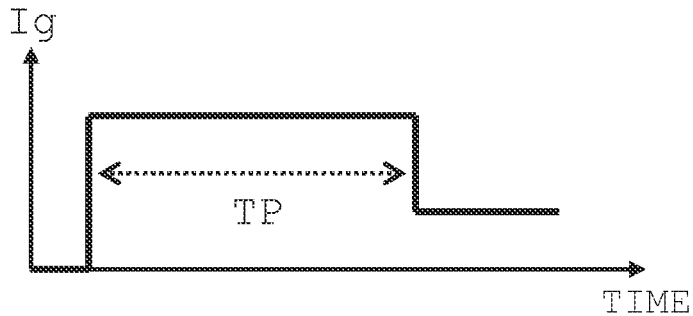
FIG. 11 shows an example of determined waveform data.
Figure 11:
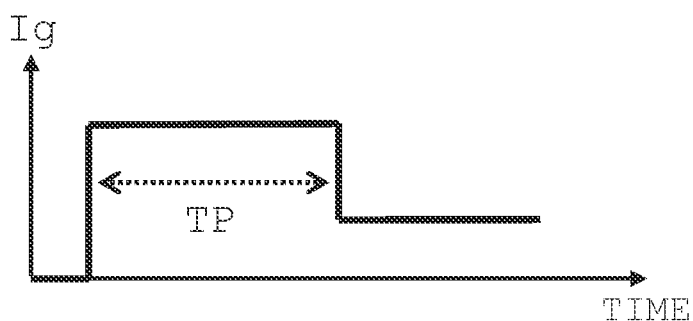
Figure 11:
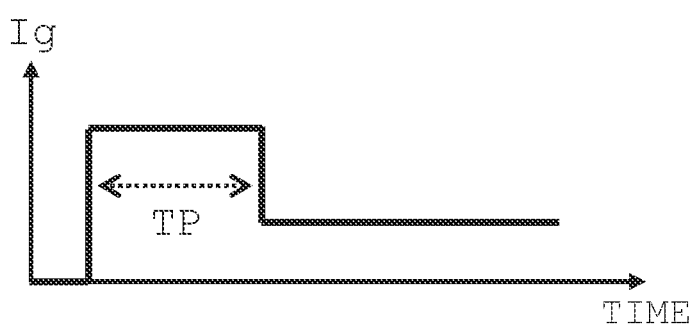

FIG. 11 shows an example of waveform data Dn determined in accordance with the flowchart of FIG. 9, where N=3. The waveform data D1 to D3, in which the lengths of the period TP are different from each other, are determined in accordance with the value of the load current Idc. In this example, as the value of the load current Idc is larger, the period TP is longer. This is because the drain current Id becomes equal to the load current Idc as the value of the load current Idc is larger, so that a longer time is required until the resonance loop is formed.

Figure 12:
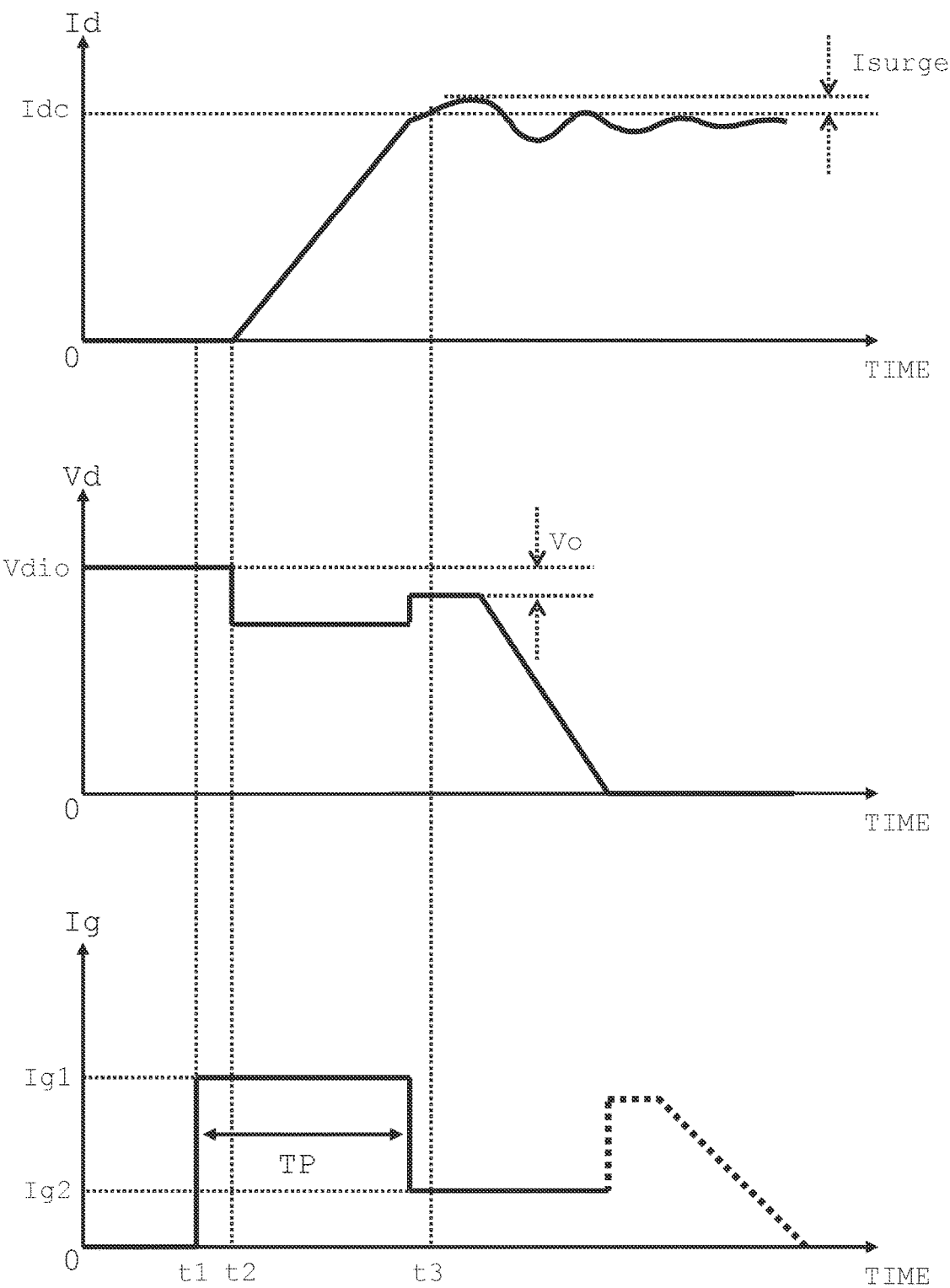
FIG. 12 shows another example of determined waveform data.

FIG. 12 shows another example of waveform data. The gate current Ig may be increased again after time t3 after determining the waveform as shown in FIG. 11, as indicated by a dotted line at the bottom of FIG. 12. By increasing the gate current Ig again, the time at which the gate voltage of a switching element reaches a power supply voltage of the drive circuit can be accelerated, which can prevent the gate voltage from fluctuating due to unexpected noise and the power device from performing an unintended operation.

As described above, electronic circuitry 20 according to Embodiment 1 comprises the processing circuit 30. The processing circuit 30 is configured to: generate waveform data of a drive current to be supplied to a switching element, provide the waveform data to a drive circuit of the switching element, and at turn-on of the switching element, correct the waveform data based on the load current Idc flowing through the load connected to the switching element and the surge current Isurge of the switching element, and determine waveform data in accordance with the load current Idc and the surge current Isurge.

According to the above features, electronic circuitry 20 according to Embodiment 1 can generate waveform data of a drive current such that reduction of power loss and suppression of noise at turn-on of a switching element are both achieved.

In electronic circuitry 20 according to Embodiment 1, the reference current In includes N reference currents from I1 to IN. The processing circuit 30 is configured to correct and determine the waveform data for each of the N reference currents I1 to IN in the above determination process. In particular, waveform data determined for the first reference current I1 is waveform data corresponding to a time at which the load current Idc is more than or equal to the first reference current I1. Waveform data determined for an n-th reference current In is waveform data corresponding to a time at which the load current Idc is more than or equal to the n-th reference current In and less than an n−1-th reference current In−1.

According to the above features, electronic circuitry 20 according to Embodiment 1 can determine waveform data of a drive current such that reduction of power loss and suppression of noise at turn-on of the switching element are both achieved in accordance with the value of the load current Idc.

Note that when determining the length of the period TP in Step S8 in FIG. 7 in Embodiment 1, the length of the period TP may be corrected to be still shorter than a present value and determined. By providing a margin in this manner, noise is suppressed more reliably.

In Embodiment 1, when correcting and determining the length of the period TP in the waveform data, the period TP is shortened stepwise by the predetermined amount after setting the initial value of the period TP to be as long as possible. This means that the period TP is shortened from an initial state in which suppression of noise is insufficient although the effect of reducing power loss is great until a state in which the surge current responsible for noise is sufficiently suppressed is brought about while weakening the effect of reducing power loss little by little. In other words, it means that greater importance is placed on suppression of noise than on reduction of power loss.

Instead, when correcting and determining the length of the period TP in the waveform data, the period TP may be extended stepwise by the predetermined amount after setting the initial value of the period TP to be as short as possible. In this case, it means that the period TP is extended from the initial state in which power loss is great although the effect of suppression of noise is sufficient to the last place where the effect of suppression of noise is kept in order to reduce power loss. In other words, it means that greater importance is placed on reduction of power loss than on suppression of noise.

MODIFICATIONS

In Embodiment 1, the three-phase inverter circuit 10 is constituted by the switching elements 11a to 11f. In each pair of switching elements, the switching elements are both N-channel MOSFETs. Instead, in a case of constituting a converter circuit, for example, one of the switching elements in each pair of switching elements is an N-channel MOSFET, and the other switching element is a diode.

The switching elements 11a to 11f are not limited to MOSFETs. For example, the switching elements 11a to 11f may be IGBTs or BJTs (bipolar junction transistors). Various materials such as Si (silicon), SiC (silicon carbide), or GaN (gallium nitride) can be used as semiconductor that constitutes the switching elements 11a to 11f.

Although some embodiments have been described, these embodiments have been presented as examples. These embodiments, not intended to limit the scope of embodiments, can be embodied in other various forms, and various omissions, replacements, changes, and combinations can be carried out without departing from the spirit of the embodiments. These embodiments and their modifications are embraced in the scope and spirit of the embodiments, and are similarly embraced in claims and equivalents thereof.

Note that the present embodiment can also be configured as indicated below.

[1]

An electronic circuitry comprising a processing circuit configured to:
  generate waveform data of a drive current to be supplied to a switching element,
  provide the waveform data to a drive circuit of the switching element, and
  at turn-on of the switching element, correct the waveform data based on a load current flowing through a load connected to the switching element and a surge current of the switching element.

[2]

The electronic circuitry according to 1, wherein
  the processing circuit configured to:
  set a reference current, and
  correct the waveform data based on a first surge current value when the load current is smaller than the reference current by a predetermined first value and a second surge current value when the load current is larger than the reference current by a predetermined second value.

[3]

The electronic circuitry according to 1 or 2, wherein
  the waveform data includes a period of a first current value and a period of a second current value which is smaller than the period of the first current value, and
  the processing circuit is configured to:
  correct the waveform data by correcting the period of the first current value.

[4]

The electronic circuitry according to 3, wherein
  the processing circuit configured to:
  shorten or extend a length of the period of the first current value stepwise by a predetermined amount, and when a difference between the first surge current value and the second surge current value becomes more than or equal to a predetermined value, determine the period of the first current value.

[5]
The electronic circuitry according to any one of 2 to 4, wherein
the reference current includes a first to an N-th, N reference currents (where N is an integer of more than or equal to 2), and
the processing circuit is configured to:
determine the waveform data for each of the N reference currents.

[6]
The electronic circuitry according to 5, wherein
the first value and the second value are set between 1 to 10% of a difference between an n-th reference current (where n is an integer of 1 to N) and an n+1-th reference current.

[7]
The electronic circuitry according to 5 or 6, wherein
the waveform data determined for the first reference current is waveform data corresponding to a time at which the load current is more than or equal to the first reference current, and
the waveform data determined for an n-th reference current (where n is an integer of 2 to N) is waveform data corresponding to a time at which the load current is more than or equal to the n-th reference current and less than an n−1-th reference current.

[8]
The electronic circuitry according to any one of 1 to 7, further comprising a first detection circuit configured to detect the load current.

[9]
The electronic circuitry according to any one of 1 to 8, further comprising a second detection circuit configured to detect the surge current.

[10]
The electronic circuitry according to any one of 1 to 9, further comprising a storage circuit configured to store a corrected waveform data.

[11]
The electronic circuitry according to any one of 1 to 10, further comprising the drive circuit configured to generate a drive current in accordance with the waveform data of the drive current provided from the electronic circuitry, and supply the drive current to the switching element.

[12]
The electronic circuitry according to any one of 1 to 11, further comprising the switching element to be driven by the drive current supplied from the drive circuit.

[13]
A power conversion device comprising:
a power conversion circuit including
two switching elements that constitute an arm pair, and
two drive circuits configured to supply a drive current to the two switching elements respectively; and
a processing circuit configured to:
generate waveform data of the drive current,
provides the waveform data to the drive circuits, and
at turn-on of the switching elements, correct the waveform data based on a load current flowing through a load connected to the switching elements and a surge current of the switching elements.

[14]
The power conversion device according to 13, further comprising three power conversion circuits, each being the power conversion circuit.

[15]
A method comprising:
generating waveform data of a drive current to be supplied to a switching element;
providing the waveform data to a drive circuit of the switching element; and
at turn-on of the switching element, correcting the waveform data based on a load current flowing through a load connected to the switching element and a surge current of the switching element.

The invention claimed is:

1. An electronic circuitry comprising a processing circuit configured to:
generate waveform data of a drive current to be supplied to a switching element,
provide the waveform data to a drive circuit of the switching element,
at turn-on of the switching element, correct the waveform data based on a load current flowing through a load connected to the switching element and a surge current of the switching element,
set a reference current, and
correct the waveform data based on a first surge current value when the load current is smaller than the reference current by a predetermined first value and a second surge current value when the load current is larger than the reference current by a predetermined second value.

2. The electronic circuitry according to claim 1, wherein
the waveform data includes a period of a first current value and a period of a second current value which is smaller than the period of the first current value, and
the processing circuit is configured to:
correct the waveform data by correcting the period of the first current value.

3. The electronic circuitry according to claim 2, wherein
the processing circuit is configured to:
shorten or extend a length of the period of the first current value stepwise by a predetermined amount, and when a difference between the first surge current value and the second surge current value becomes more than or equal to a predetermined value, determine the period of the first current value.

4. The electronic circuitry according to claim 1, wherein
the reference current includes a first to an N-th, N reference currents (where N is an integer of more than or equal to 2), and
the processing circuit is configured to:
determine the waveform data for each of the N reference currents.

5. The electronic circuitry according to claim 4, wherein
the first value and the second value are set between 1 to 10% of a difference between an n-th reference current (where n is an integer of 1 to N) and an n+1-th reference current.

6. The electronic circuitry according to claim 4, wherein
the waveform data determined for the first reference current is waveform data corresponding to a time at which the load current is more than or equal to the first reference current, and
the waveform data determined for an n-th reference current (where n is an integer of 2 to N) is waveform data corresponding to a time at which the load current is more than or equal to the n-th reference current and less than an n−1-th reference current.

7. The electronic circuitry according to claim 1, further comprising a first detection circuit configured to detect the load current.

8. The electronic circuitry according to claim 1, further comprising a second detection circuit configured to detect the surge current.

9. The electronic circuitry according to claim 1, further comprising a storage circuit configured to store a corrected the waveform data.

10. The electronic circuitry according to claim 1, further comprising the drive circuit configured to generate a drive current in accordance with the waveform data of the drive current provided from the electronic circuitry, and supply the drive current to the switching element.

11. The electronic circuitry according to claim 10, further comprising the switching element to be driven by the drive current supplied from the drive circuit.

12. A power conversion device comprising:
a power conversion circuit including
two switching elements that constitute an arm pair, and
two drive circuits configured to supply a drive current to the two switching elements respectively; and
a processing circuit configured to:
generate waveform data of the drive current,
provides the waveform data to the drive circuits,
at turn-on of the switching elements, correct the waveform data based on a load current flowing through a load connected to the switching elements and a surge current of the switching elements,
set a reference current, and
correct the waveform data based on a first surge current value when the load current is smaller than the reference current by a predetermined first value and a second surge current value when the load current is larger than the reference current by a predetermined second value.

13. The power conversion device according to claim 12, further comprising three power conversion circuits, each being the power conversion circuit.

14. A method comprising:
generating waveform data of a drive current to be supplied to a switching element;
providing the waveform data to a drive circuit of the switching element;
at turn-on of the switch element, correcting the waveform data based on a load current flowing through a load connected to the switching element and a surge current of the switch element;
setting a reference current; and
correcting the waveform data based on a first surge current value when the load current is smaller than the reference current by a predetermined first value and a second surge current value when the load current is larger than the reference current by a predetermined second value.

* * * * *